(12) United States Patent
Gaucher (10) Patent No.: US 11,697,396 B2
(45) Date of Patent: Jul. 11, 2023

(54) DEFLECTOR FOR A WIPING SYSTEM INCLUDING AN ENGRAVING AREA

(71) Applicant: VALEO SYSTEMES D'ESSUYAGE, La Verriere (FR)

(72) Inventor: Vincent Gaucher, La Verriere (FR)

(73) Assignee: Valeo Systemes d'Essuyage, La Verriere (FR)

( * ) Notice: Subject to any disclaimer, the term of this patent is extended or adjusted under 35 U.S.C. 154(b) by 0 days.

(21) Appl. No.: 16/906,878

(22) Filed: Jun. 19, 2020

(65) Prior Publication Data

US 2020/0406862 A1    Dec. 31, 2020

(30) Foreign Application Priority Data

Jun. 28, 2019  (FR) ...................................... 1907220

(51) Int. Cl.
*B60S 1/38* (2006.01)
*B60S 1/04* (2006.01)

(52) U.S. Cl.
CPC .............. *B60S 1/381* (2013.01); *B60S 1/0408* (2013.01); *B60S 1/0491* (2013.01)

(58) Field of Classification Search
CPC ...... B60S 1/3806; B60S 1/3808; B60S 1/381; B60S 1/0408; B60S 1/0491
USPC ................... 15/250.201; 219/121.68, 121.69; 264/400, 139
See application file for complete search history.

(56) References Cited

U.S. PATENT DOCUMENTS

| | | | | |
|---|---|---|---|---|
| 5,478,426 A | * | 12/1995 | Wiler | B41M 5/24 |
| | | | | 156/272.8 |
| 5,880,430 A | | 3/1999 | Wein | |
| 6,284,184 B1 | * | 9/2001 | Choi | B29C 45/0053 |
| | | | | 264/139 |
| 2014/0123429 A1 | * | 5/2014 | Lee | B60S 1/4003 |
| | | | | 15/250.201 |

FOREIGN PATENT DOCUMENTS

| | | | |
|---|---|---|---|
| DE | 102008041261 | * | 2/2010 |
| EP | 2415645 A | | 2/2012 |
| EP | 2610120 A2 | | 7/2013 |
| FR | 3067312 A1 | | 12/2018 |
| WO | 2018077757 | | 5/2018 |

OTHER PUBLICATIONS

English language translation of description portion of German publication 102008041261, published Feb. 2010 (Year: 2010).*
National Industrial Property Institute of France, Preliminary Search Report for related Application No. FR 1907220, dated Apr. 2, 2020.

* cited by examiner

*Primary Examiner* — Gary K. Graham
(74) *Attorney, Agent, or Firm* — Valeo Systemes d'Essuyage (57) ABSTRACT

A spoiler of an automotive wiper system that extends in a main direction of elongation and is configured to be mounted on the wiper system's arm or a wiper where the spoiler is predominantly formed by a one-piece main layer, where the spoiler includes at least one engraving zone in which the main layer has a cavity that houses at least one secondary layer that is distinct from the main layer and the engraving zone is configured in such a way that the at least one secondary layer is elongated while being at least partially covered by the main layer.

9 Claims, 4 Drawing Sheets

DEFLECTOR FOR A WIPING SYSTEM INCLUDING AN ENGRAVING AREA

CROSS-REFERENCE TO RELATED APPLICATIONS

This application claims priority benefit to French Application No. 1907220, filed Jun. 28, 2019, the disclosure of which is incorporated in its entirety by reference herein.

TECHNICAL FIELD

The present invention relates to a wiper system and more particularly to a spoiler of such a wiper system.

BACKGROUND

A motor vehicle is conventionally equipped with a wiper system for cleaning a glazed surface, notably a windshield, and avoiding disruption to the driver's view of his/her surroundings. These wiper systems, known by the name of windshield wipers, generally comprise a driving arm that performs a back-and-forth movement across the glazed surface, and elongate wipers borne by the drive arm and which themselves carry wiper blade rubbers made of a resilient material. These blade rubbers rub against the windshield and remove the water and dirt by moving it from the driver's field of view. The wipers are produced in the form either, in a conventional version, of articulated yokes which support the blade rubber at a number of discrete locations, giving it a bow that allows it to conform to whatever curvature the windscreen may have, or, in a more recent version, known as the "flat blade" version, of a semi-rigid assembly which supports the blade rubber along its entire length by virtue of one or more stiffening ribs that allow the wiper to be pressed firmly against the windshield without the need to employ yokes.

The wipers commonly comprise at least one spoiler positioned on the support of the blade rubber, or on an opposite face to the glazed surface against which the blade rubber extends, this or these spoilers having a curved deflection surface that catches the wind when the vehicle is running. This deflection surface contributes to deflecting the air flow and improving the aerodynamic performance of the vehicle and to improving the firm application of the blade rubber to the glazed surface.

SUMMARY

It is known practice also to use the spoiler as a support element on which to fix a logo or any other inscription, by marking the spoiler notably on the blade-rubber support or on the deflection surface. This marking of the spoiler may notably be achieved using pigmented paint or any other substance that adheres sufficiently to the spoiler.

One disadvantage with such a system for marking the spoiler lies in its durability, notably in the face of the water and the dirt liable to come into contact with the wiper system. Specifically, in the face of these external elements, the marking may gradually fade, thus reducing its visibility. The marking of the spoilers can therefore be improved in order to give it greater resistance to environmental elements.

In this context, one object of the invention is to conceive of an alternative to the above-mentioned spoiler-marking system by proposing a spoiler for a wiper system, particularly of a motor vehicle, which extends in a main direction of elongation and which is configured to be mounted on a wiper or on a drive arm of the wiper system, said spoiler being formed predominantly by a one-piece main layer, wherein said spoiler comprises at least one engraving zone in which the main layer has a cavity to house at least one secondary layer distinct from the main layer, the engraving zone being configured in such a way that said at least one secondary layer extends while being at least partially covered by the main layer.

The spoiler is formed predominantly of the one-piece main layer, which may be a flexible material, notably elastomer. Also, the spoiler comprises the at least one secondary layer at least partially covered by the main layer and which forms the engraving zone. The engraving zone therefore corresponds to the zone of the spoiler where the spoiler has a multi-layer structure, the secondary layer or layers either being or not being revealed by an operation of marking of the multi-layer engraving zone. It will be appreciated from the foregoing that the spoiler is special in that it has an engraving zone distinct from the rest of the spoiler, because this engraving zone has a multi-layer structure whereas the rest of the spoiler has a single-layer structure with only the one-piece main layer, and notably in the direct continuation of the engraving zone. It is thus possible to clearly identify the demarcation between the engraving zone and the rest of the spoiler through the presence of a secondary layer or of a stack of secondary layers.

According to one feature of the invention, the engraving zone comprises at least one opening in the main layer revealing the at least one secondary layer. In other words, a removal of material of the main layer of the spoiler is performed in the engraving zone, revealing part of the secondary layer arranged beneath the main layer, it being noted that this secondary layer is revealed only in the engraving zone at the location of the opening, whereas it remains covered by the main layer in all of the remainder of the engraving zone.

According to one feature of the invention, the main layer and the secondary layer are formed of the same material. This feature makes it possible to achieve better adhesion between the main layer and the secondary layer and thus makes the spoiler easier to design. The main layer and the secondary layer may for example be made from a flexible material such as elastomer. Alternatively, the main layer and the secondary layer may be formed of materials that differ from one layer to the other, provided that these materials are compatible from the point of view of mutual adhesion of the layers, namely that they allow optimal adhesion of the secondary layer to the main layer.

According to one feature of the invention, the main layer and the secondary layer contain distinct pigments. It will therefore be appreciated that the opening in the engraving zone, aimed at removing the main layer in discrete locations, allows the secondary layer, which contains pigments distinct from the main layer, to be revealed. The distinct pigments notably allow the main layer and the secondary layer to be differentiated to the naked eye.

According to one feature of the invention, the engraving zone is created in a plate that forms the base of the spoiler, said plate comprising an external face from which there projects a fin that forms an air-deflection surface, and an internal face intended to face a blade rubber, the engraving zone being formed of a thickness of the main layer positioned to overlap the secondary layer or layers. The base of the spoiler extends in the main direction of elongation of the spoiler and the external face of the plate that forms this base corresponds to the face that the air flow strikes as the vehicle moves along. In other words, this external face is the opposite face to the glazed surface when the wiper system is installed on the motor vehicle and therefore corresponds to the visible face of the spoiler. The benefit of creating the engraving zone on this external face will therefore be appreciated, notably in order to make the marking produced on this spoiler visible. The engraving zone is said to be formed on the external face because the portion of the main layer that contributes to forming the engraving zone, arranged so that it overlaps the secondary layer or layers, is attacked, notably by laser engraving, to reveal part of a secondary layer and form the marking, from an opposite surface to the secondary layer or layers and which contributes to forming the external face of the spoiler and notably of the plate.

According to one feature of the invention, the spoiler comprises a first retaining claw and a second retaining claw each extending from one transverse end of the plate in a direction substantially perpendicular to the main direction of elongation of the spoiler and facing one another, for example so as to collaborate with a body of the wiper, at least part of the retaining claws being made of a material that is stiffer than the material used for the rest of the spoiler. The retaining claws have the function of holding the spoiler on the wiper, notably by partially surrounding same. One portion of the retaining claws is therefore made from a material that is stiffer than the material of the rest of the spoiler, for example the plate or the fin, so that retention on the wiper is optimal.

According to one feature of the invention, the at least one secondary layer extends in the direction of elongation of the spoiler from a first longitudinal end as far as a second longitudinal end of the spoiler. The benefit of such a feature is notably that it makes the spoiler easier to produce by simultaneous extrusion of each of the layers for example, while at the same time allowing several openings to be created along the spoiler. The engraving zone thus extends from one end of the spoiler to the other and allows a marking to be produced, by targeted engraving at a precise location of the engraving zone, anywhere along the length of the spoiler.

According to one feature of the invention, the spoiler comprises at least two secondary layers placed one on top of another in a direction of stacking. And according to another feature of the invention, notably implemented when the secondary layers are stacked, the at least two secondary layers have the same thickness. The thickness is measured along a straight line parallel to the direction of stacking of the secondary layers. The two secondary layers are both housed within the main layer and are superposed in a direction perpendicular to the main direction of elongation of the spoiler and perpendicular to the external face of the spoiler in the engraving zone. The benefit of having the same thickness from one secondary layer to another notably lies in the fact that the same tool in common for marking the component in the engraving zone can be used with a constant power to reveal one or other of the secondary layers, the effort to be supplied for marking, whether this be in terms of the time taken to perform the engraving operation or else the number of successive isolated operations to perform this engraving, then being directly proportional to the number of layers that need to be eliminated in order to reveal one of the secondary layers.

In this context of having a plurality of stacked secondary layers, the secondary layers may have mutually different pigments which also differ from the pigments used in the main layer.

Alternatively, the spoiler comprises at least two secondary layers positioned side-by-side. According to the foregoing, the at least two secondary layers may have the same thickness. The two secondary layers are both housed within the main layer, and are positioned one after the other, in the main direction of elongation of the spoiler just as in a direction perpendicular to this main direction of elongation, so as to form an assembly substantially parallel to the external face of the spoiler. The benefit of having the same thickness from one secondary layer to another notably lies in the fact that the same tool in common for marking the component in the engraving zone can be used with a constant power to reveal either one or other of the secondary layers. Here again, the secondary layers may have mutually different pigments which also differ from the pigments used in the main layer.

The invention also relates to a wiper system for a motor vehicle, comprising a wiper and an arm which are connected to one another by a connection interface, the wiper system comprising at least one spoiler having the above-mentioned features.

The spoiler may notably be located on the drive arm of this wiper system, or else be located on the wiper.

The invention also relates to a method for engraving a spoiler comprising a base, at least one deflection surface, a main layer and an engraving zone comprising at least one secondary layer according to one of the above features, the engraving method consisting in making at least one marking by applying a beam emitted by a laser source to the engraving zone in such a way that it creates an opening in the engraving zone, which opening is configured to pass at least through the main layer and reveal one of the secondary layers present in the engraving zone.

According to one feature of the method, the marking may comprise several openings of distinct depths, so as to reveal a first secondary layer in a first part of the engraving zone and a second secondary layer in a second part of the engraving zone. Parts of the engraving zone may therefore be perceived by the user to have different colors, in order to make a message or a mark, for example, easier to identify.

The engraving zone is made are of at least one of the secondary layers covered by the main layer. The secondary layer and the main layer are therefore made of the same material, for example rubber, but contain different pigments so that the main layer and the second layer can be differentiated to the naked eye.

The laser source may be a spot laser and allows the main layer to be heated in order to remove material forming the opening and revealing the secondary layer. It is therefore possible for the spoiler to comprise two secondary layers. The two secondary layers are then revealed alternatively in the engraving zone by the laser, notably according to its intensity or its number of impingements on the engraving zone.

BRIEF DESCRIPTION OF THE DRAWINGS

Further features, details and advantages of the invention will become more clearly apparent, on the one hand from reading the following description, and on the other hand from several exemplary embodiments given by way of non-limiting indication, with reference to the attached schematic drawings, in which.

DETAILED DESCRIPTION

The features, variants and different embodiments of the invention may be combined with one another, in various combinations, as long as they are not mutually incompatible or mutually exclusive. It will be possible, in particular, to imagine variants of the invention that comprise only a selection of the features described below, in isolation from the other features described, if this selection of features is sufficient to confer a technical advantage or to distinguish the invention from the state of the art.

In the following description, the terms "longitudinal", "transverse" or "vertical" refer to the orientation of the spoiler of the wiper system according to the invention. The longitudinal direction corresponds to the main axis of elongation of the spoiler, while the transverse and vertical directions correspond to straight lines which are respectively perpendicular to the longitudinal axis of the spoiler and perpendicular to one another, the vertical direction corresponding to the direction perpendicular to the glazed surface that the wiper comprising the spoiler is liable to clean. In this context, the upper and lower orientations correspond to orientations parallel to the vertical direction of the spoiler, the term "lower" signifying facing the glazed surface.

Figure 1:
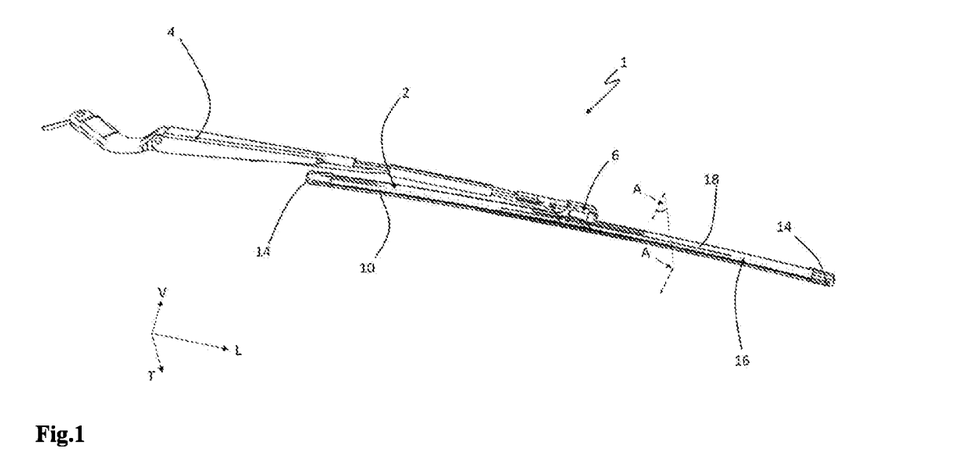
FIG. 1 is a perspective overall view of a wiper system comprising a drive arm connected to a wiper by a connection interface, the wiper comprising at least one spoiler according to the invention.

FIG. 1 illustrates a wiper system 1 notably comprising a wiper 2 of the wiper system 1, a drive arm 4 for driving the wiper 2 and a connection interface 6 connecting the drive arm 4 to the wiper 2.

The arm 4 is actuated so that it performs back and forth movements along a glazed surface, in this instance of a motor vehicle, and the wiper 2 is mounted at the free end of this drive arm and comprises a blade rubber intended to clean the glazed surface and for that purpose arranged in contact with this glazed surface. The connection interface 6, which is made up, amongst other things, of an adapter and of a connector, allows the drive arm to be connected to the wiper. A cover may also cover the connection interface in order to afford the latter mechanical protection against external elements which may become lodged between the connector and the adapter.

The wiper 2 in the example illustrated is of the flat blade type and comprises a wiper body 8 (notably visible in FIG. 2) which extends longitudinally, in a main direction of elongation, and which is configured to bear a wiper blade rubber 10, generally made of rubber, and at least one stiffening rib 12 (also visible in FIG. 2) which stiffens the wiper 2 while at the same time allowing it to flex so that the wiper blade rubber can be pressed firmly against a glazed surface that is to be cleaned, notably a windshield, of a motor vehicle.

The wiper 2 may comprise end fittings 14, positioned at each of the longitudinal ends of the wiper so as to hold the blade rubber 10 and the rib 12 in place within the wiper 2 body 8.

The wiper system comprises at least one spoiler 16 comprising a deflection surface 18. In what follows, an embodiment will be described, with reference to the figures, in which embodiment the spoiler 16 is associated with the wiper 2 and more particularly with the wiper body 8. More particularly, in the example illustrated, the wiper 2 body 8 comprises two spoilers 16 aligned in series, one on each side of the connection interface 6. However, it should be noted that the spoiler as it will be described, and notably its composition in several layers that allow a secondary layer to be revealed in an engraving zone in order to generate a representation of a logo or of a mark, for example, may, without departing from the scope of the invention, be applied to the drive arm.

In any event, the deflection surface 18 is configured in such a way that, when the wiper system is installed on the vehicle, the deflection surface 18 extends across the path of the air flow when the vehicle is running and so that it faces toward the front of the vehicle. The spoiler 16 is intended to improve the firmness with which the wiper 2 is pressed against the glazed surface, thanks to the force of the air flow acting on the deflection surface 18.

Figure 2:
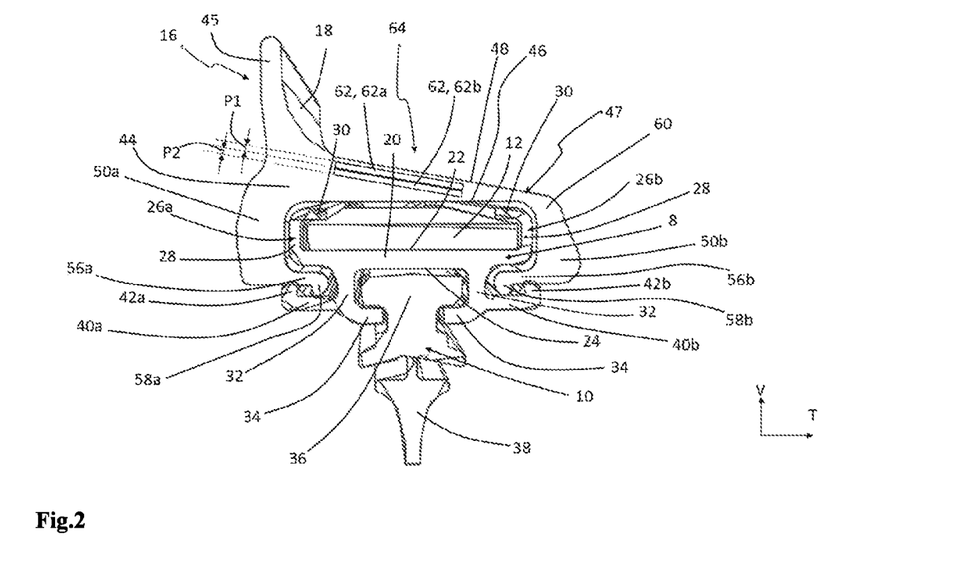
FIG. 2 is a view in section, on a transverse plane A-A illustrated in FIG. 1, of the wiper bearing the spoiler.

FIG. 2 illustrates the positioning of the spoiler 16 on the body 8 the wiper 2, in a view in section on a transverse plane A visible in FIG. 1.

The body 8 is configured in such a way that its bears, on the one hand, the stiffening rib 12 and, on the other hand, the blade rubber 10. The body 8 comprises a plateau 20 extending mainly in the main direction of elongation, said plateau 20 comprising an upper face 22, in contact with the stiffening rib 12, and a lower face 24, facing toward the blade rubber 10.

A first retaining member 26a and a second retaining member 26b extend from transverse ends of the plateau 20 and hold the stiffening rib 12. More specifically, the first retaining member 26a and the second retaining member 26b each comprise a first portion 28 extending substantially vertically from the transverse ends of the plateau 20 and on each side of the stiffening rib 12. A second portion 30 then extends each of the first portions 28 perpendicularly so that the second portions 30 are folded back against the stiffening rib 12. The second portions 30 folded back against the stiffening rib 12 prevent the latter from moving in a vertical direction V.

The lower part of the body 8, below the plateau 20, is configured to bear the blade rubber 10 of the wiper system. For this purpose, two arms 32 extend mainly in the direction of elongation of the wiper and emerge perpendicularly from the plateau 20, toward the opposite side from the stiffening rib 12. The arms 32 each have an arm end 34, folded back perpendicularly toward the other arm end to form a housing to accept an anchoring heel 36 of the blade rubber 10. Stated differently, each of the arm ends 34 extends substantially perpendicularly from one of the arms 32 and in such a way that they prevent the anchoring heel 36 of the blade rubber 10 from exiting the spoiler 16 in the vertical direction V. On the opposite side of the blade rubber 10 from the anchoring heel 36 there extends a lip 38 of the blade rubber 10, which lip is intended to be in contact with the glazed surface of the motor vehicle.

The body 8 also comprises a first retaining finger 40a and a second retaining finger 40b which are configured to form an attachment zone for attaching the spoiler 16. The first retaining finger 40a and the second retaining finger 40b each extends substantially perpendicularly from the arms 32 of the body 8 and in a direction away from one another toward the outside of the body 8. Each of the retaining fingers 40a, 40b comprises a turned-up edge 42a, 42b extending substantially perpendicularly from the retaining finger 40a, 40b and in the direction of the plateau 20 of the wiper body, so as to form a cavity to accept part of the spoiler, this collaboration being detailed later on in the description.

The spoiler 16 will now be described in greater detail, notably with reference to FIGS. 2 to 4. As mentioned previously, the spoiler 16 extends in a main direction of elongation substantially parallel to the main direction of elongation of the wiper of the wiper system.

The spoiler 16 comprises a base 44, notably comprising the means of retention on the wiper, and a fin 45 arranged projecting from the base and which notably exhibits the deflection surface 18.

The base 44 more particularly comprises a plate 47, which forms a wall covering the body of the wiper and which has an internal face 46, facing toward the stiffening rib 12 and in general toward the blade rubber 10 of the wiper, and an external face 48 on the opposite side to the internal face 46, and means of retention on the aforementioned wiper 2 body 8. For that purpose, the base 44 comprises, in addition to the plate 47, a first retaining claw 50a and a second retaining claw 50b, each one extending substantially perpendicularly from a transverse free end of the internal face 46 of the plate. The retaining claws 50a, 50b also extend in the main direction of elongation of the spoiler 16 from a first longitudinal end 52 to a second longitudinal end 54 of the spoiler 16.

The spoiler is dimensioned in such a way that, once it is installed on the wiper body, the retaining claws 50a, 50b each extend facing one of the first portions 28 of the retaining members 26a, 26b that retain the stiffening rib 12.

The first retaining claw 50a and the second retaining claw 50b are extended at their free ends by a first retaining tooth 56a and a second retaining tooth 56b, respectively. The first retaining tooth 56a and the second retaining tooth 56b each extend substantially perpendicularly from the end of the first retaining claw 50a and the end of the second retaining claw 50b and toward the body 8. When the spoiler is in a position in which it is assembled on the wiper, as visible in FIG. 3, which position is obtained either by sliding it from one longitudinal end of the wiper or by elastically deforming the retaining claws 50a, 50b, the retaining teeth 56a, 56b of the spoiler 16 each extend into a cavity formed between the plateau 20 and the retaining fingers 40a, 40b of the body 8, thus preventing vertical movement of the spoiler 16.

Figure 3:
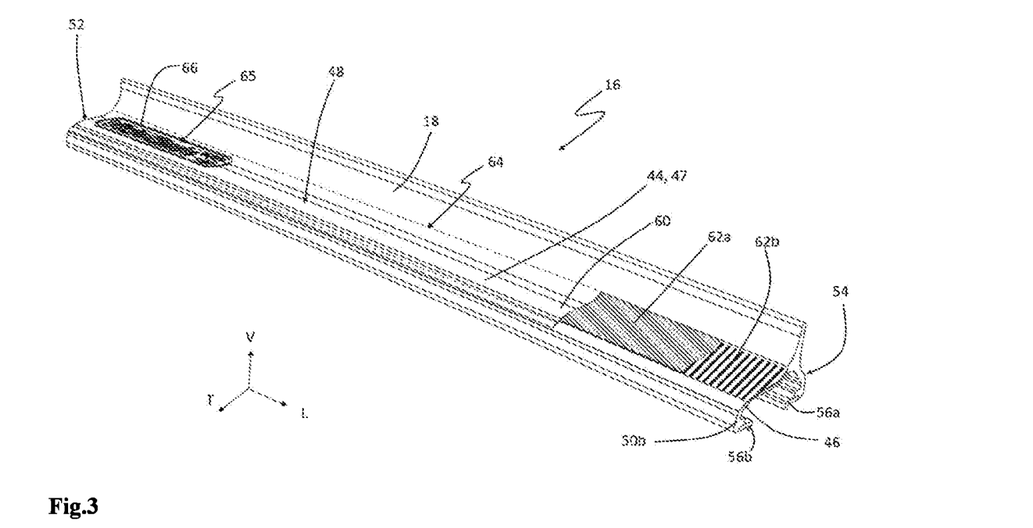
FIG. 3 is a perspective view of a spoiler similar to that of FIGS. 1 and 2, here depicted alone without the associated wiper, the perspective making it possible to see an inscription obtained by etching according to a method that forms the subject matter of the invention, a portion of the upper layer of the spoiler having been cut away in order to show the multi-layer construction of the spoiler.

A first hook 58a and a second hook 58b are formed respectively at the free ends of the retaining teeth 56a, 56b, extending these retaining teeth perpendicularly in the opposite direction from the retaining claws, so that, in the assembled position of FIG. 3, these hooks 58a, 58b, together with the turned-up edges 42a, 42b of the body 8 form a transverse end-stop against disengagement of the spoiler.

The base 44 of the spoiler therefore here has a U-shaped cross section, with the base of the U being formed by the plate 47 and with the branches of the U formed respectively by the first retaining claw 50a and the second retaining claw 50b, the U-shape allowing it to cover the body 8.

The external face 48 of the plate 47 corresponds to the opposite face to the glazed surface when the wiper system is installed. The deflection surface 18 extends substantially perpendicularly from this external face 48 and in the direction of elongation of the spoiler 16 from the first longitudinal end 52 to the second longitudinal end 54 of the spoiler 16. More specifically, the fin 45 is configured in such a way that the deflection surface 18 exhibits a curved profile, notably having a concave shape allowing aerodynamic guidance of the air flow that comes into contact with this deflection surface. It should be noted that the fin 45, and the deflection surface 18 that it exhibits, extends substantially from one transverse end of the spoiler base 44, and more particularly the transverse end intended to be the end that faces toward the rear of the vehicle when the cleaning system is installed on the vehicle. It will be appreciated from the foregoing that, when the motor vehicle is moving along, the air flow will first of all skim over the external face 48 of the plate 47 and then come up against the deflection surface 18 and the curved shape thereof so that the air flow is deflected from its initial path.

The spoiler 16 is a one-piece part, so that none of these components, whether it be the base 44 or the fin 45 in particular, can be removed without damaging the whole.

The plate and the retaining claws that contribute to forming the base 44, together with the fin 45, are produced as a single component, in a single piece, notably obtained by an injection-molding operation or an extrusion operation, these manufacturing methods being given here by way of non-limiting example.

This one-piece component is made chiefly from a flexible material and may notably and non-limitingly be made of elastomer, more particularly of rubber.

This one-piece component has an essentially single-layer structure which extends over the majority of the spoiler, in this instance notably in the fin and the retaining claws, with a multi-layer zone on the remainder of the spoiler, in this instance the plate 47. This multi-layer zone consists of an engraving zone 64 which will be described in greater detail hereinafter.

In a first embodiment, notably visible in FIG. 2, the retaining teeth 56a, 56b are also produced as one piece with the rest of the base and form a continuity with the single-layer structure of the remainder of the spoiler. Such an embodiment offers the advantage of simplifying the method for obtaining the spoiler.

Figure 4:
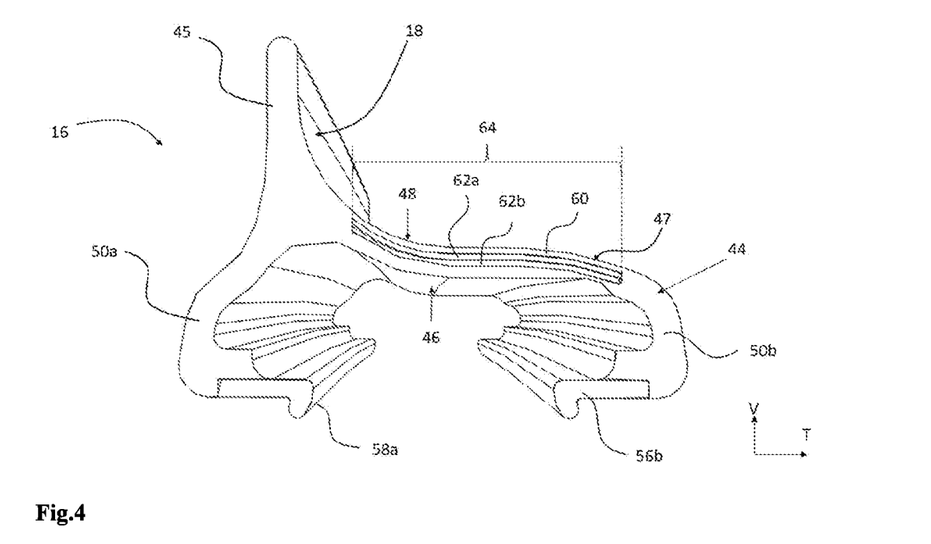
FIG. 4 is a side view of the spoiler of FIG. 3, notably showing the various thicknesses of the layers that form the engraving zone of the spoiler according to the invention.

In a second embodiment, notably visible in FIGS. 3 and 4, the retaining teeth 56a, 56b are made from a different material from the remainder of the spoiler, and for example from polypropylene, so as to have a material that is stiffer than the one used for the base of the spoiler and thus allow better retention of the spoiler 16 on the wiper 2.

In other words, according to the invention, at least the plate 47, the fin and its deflection surface 18 as well as the retaining claws 50a, 50b are formed of a main layer 60 and the spoiler is configured in such a way that, in the engraving zone 64, at least one secondary layer 62 is positioned in the thickness of this main layer.

The secondary layer or layers 62 present in the engraving zone 64 are distinguished from the main layer 60 and from each of the other layers so as to offer a different visual appearance, so that the user is able to identify it or them. According to one exemplary embodiment, the secondary layer or layers 62 may be distinguished through the use of a flexible material slightly different from that used for the main layer.

Preferably, the secondary layer or layers 62 present in the engraving zone 64 are made from the same material as the main layer 60, so as to make the spoiler easy to obtain, notably in an injection-mould process, and are distinguished from the main layer 60 through specific pigmentation of each secondary layer 62.

In the various examples illustrated, the spoiler 16 comprises a first secondary layer 62a and a second secondary layer 62b, it being appreciated that this number can vary provided that the following features relating to pigmentation in particular are adhered to. As explained hereinabove, the main layer 60, the first secondary layer 62a and the second secondary layer 62b are made from the same material, for example rubber, and also have distinct pigments so that they can be differentiated to the naked eye. Alternatively, the materials selected for forming the main layer and the secondary layer or layers may differ provided that they provide near-similar adhesion to that obtained by the use of the same material for the various layers.

The two secondary layers 62a, 62b are formed in the thickness of the plate 47 and they are superposed on one another in a direction of stacking substantially perpendicular to the plane in which the external face 48 of this plate 47 extends. As illustrated in FIGS. 2 to 4, the plane of the external face of the plate 47 may be inclined with respect to a transverse longitudinal plane so that the direction of stacking is inclined with respect to the vertical direction V of the spoiler 16.

The engraving zone 64 thus comprises at least one thickness of the main layer 60 covering the secondary layer or the stack of secondary layers 62a, 62b, namely with there being a thickness of the main layer 60 that forms the external face 48 of the plate 47.

Figure 7:
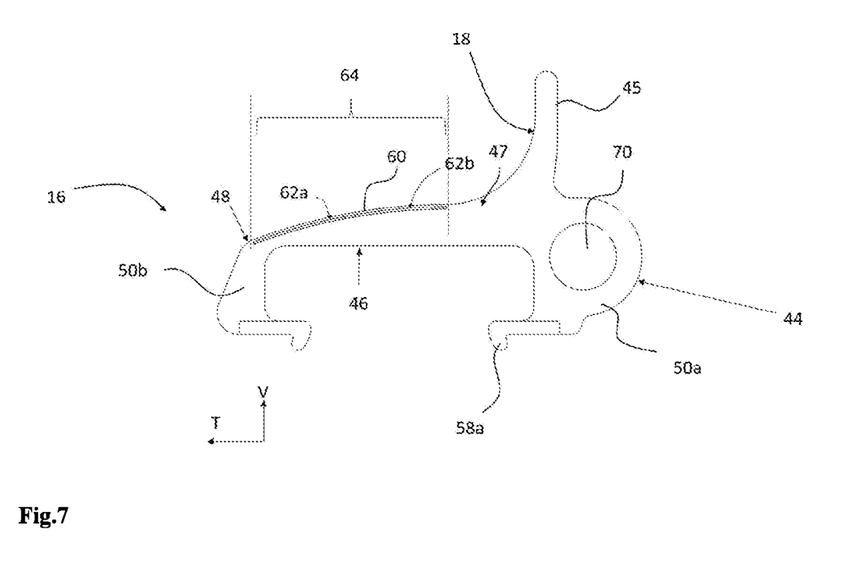
FIG. 7 is a side view of a variant of the spoiler, notably showing a different arrangement of the secondary layers that form part of the engraving zone of the spoiler according to the invention.

In a variant illustrated in FIG. 7, the secondary layers 62a, 62b, of which there are two here, are formed in the thickness of the plate 47, but this time positioned side-by-side. Unlike in the other examples illustrated, the layers are not superposed on one another in a direction of stacking substantially perpendicular to the plane in which the external face 48 of this plate 47 extends, but are arranged substantially in the same plane, referred to as secondary plane, parallel to the plane in which the external face 48 of this plate 47 extends. In the example illustrated in FIG. 7, the two secondary layers are contiguous so as to extend one after the other in a direction perpendicular to the direction of elongation of the spoiler.

According to the foregoing, the engraving zone 64 thus comprises at least one thickness of the main layer 60 covering a layer formed by the side-by-side arrangement of several secondary layers 62a, 62b, namely with there being a thickness of the main layer 60 that forms the external face 48 of the plate 47.

In the examples illustrated, the engraving zone consists of an encapsulation of the secondary layers inside the main layer 60, with a vertically closed housing which is formed in the thickness of the main layer. Thus, a thickness of the main layer 60 forms the internal face 46 of the plate. Alternatively, it is conceivable for the secondary layers 62a, 62b present in the engraving zone 64 to be covered by the main layer 60 only on the external face 48 of the plate 47 but not on the internal face 46. In other words, in a variant not illustrated here, it is conceivable for the zone that accepts the secondary layers to be open on the internal face of the spoiler, in this case the plate, unlike in the embodiment illustrated in which this zone is closed both on the external face of the spoiler and on the internal face of the spoiler.

The first secondary layer 62a and the second secondary layer 62b have a first thickness P1 and a second thickness P2, respectively. The thicknesses P1, P2 are measured along a straight line perpendicular to the plane in which the external face 48 of this plate 47 extends, and notably parallel to the direction of stacking of the secondary layers on one another when these layers are stacked. As illustrated, the first thickness P1 and the second set thickness P2 are identical here.

As notably visible in FIG. 4, in the engraving zone 64, the thickness of the main layer that is covering the secondary layers, namely the thickness of the main layer that contributes to forming the external face, in this instance of the plate, is equal to the thickness of the secondary layers. Such a feature is notably advantageous for facilitating the marking operation that needs to take place in the engraving zone.

The first secondary layer 62a and the second secondary layer 62b may extend from the first longitudinal end 52 of the spoiler 16 and as far as the second longitudinal end 54 of the spoiler 16. The engraving zone 64, which consists of the zone of the spoiler in which the structure of the spoiler is a multi-layer structure with a superposition of at least one secondary layer 62 and of a thickness of main layer 60, may thus extend from one longitudinal end of the spoiler to the other. Of course, the foregoing is one exemplary embodiment and the engraving zone, which is to say the zone comprising the plurality of distinct layers, which are distinct for example in terms of their pigmentation, could extend over a portion of the length of the spoiler, or over various portions spaced apart.

A marking 65 can be created in the engraving zone 64 by the removal of material, for example using a laser cutting operation, from the main layer that covers the secondary layer or layers in this engraving zone. As illustrated in FIG. 3, the engraving zone therefore comprises, for achieving this marking, at least one opening 66 that reveals one or other of the secondary layers 62a, 62b. What is meant by an opening 66 is a removal of material from the main layer 60, from the external face 48, so that one of the secondary layers 62 is revealed. The depth of the opening 66 is dependent on the secondary layer that is to be revealed. For example, the opening may extend from the external face 48 only in the main layer 60 and therein down to the first secondary layer 62a, so that it is this first secondary layer and its particular color, where appropriate, that are visible, or else this opening may extend through the main layer 60 and in the first secondary layer 62a down to the second secondary layer 62b, so that it is this second secondary layer and its particular color, where appropriate, that are visible. In the example illustrated in FIG. 3, several distinct openings are made in order to reveal a distinctive sign that the user can identify.

In FIG. 3, it should be appreciated that the engraving zone 64 extends from one longitudinal end to the other, said engraving zone being depicted in dotted line, and that a marking 65 is produced in this engraving zone at one longitudinal end of the spoiler. At the other end, it is in order to aid the study and understanding of the stacking of the secondary layers that the spoiler has been depicted with cutaway, with part of the main layer 60 having been removed to reveal the various superposed secondary layers.

One example of an engraving method will now be detailed with reference to FIG. 5 which illustrates part of the spoiler 16 prior to marking by engraving, and FIG. 6 which illustrates the same part of the spoiler 16 of FIG. 4 after the marking has been produced in the engraving zone.

Figure 5:
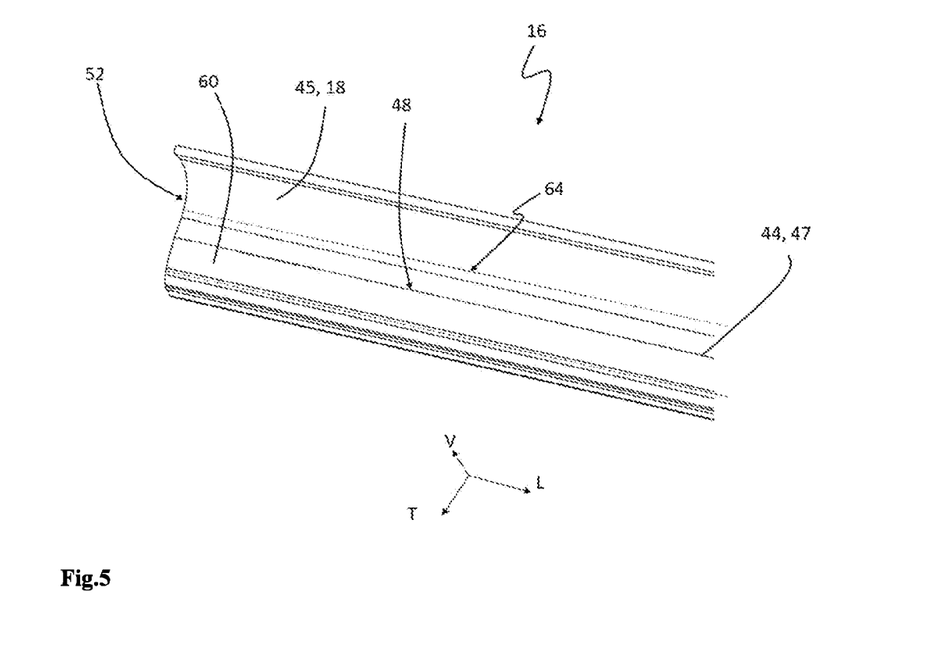
FIG. 5 is a perspective view of a longitudinal end of the spoiler of FIG. 3, prior to engraving.
Figure 6:
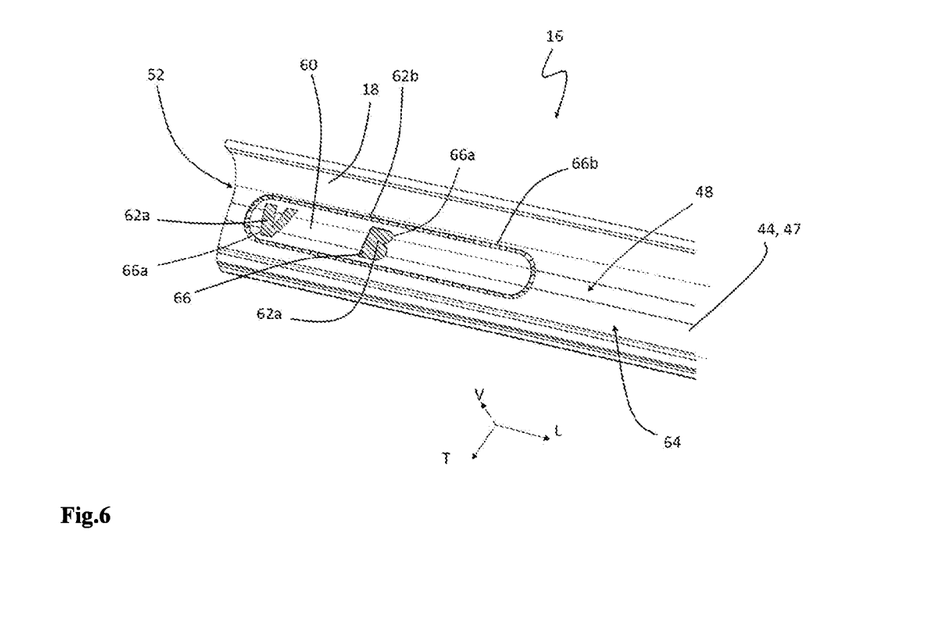
FIG. 6 is a perspective view of the longitudinal end of the spoiler of FIG. 4, after engraving.

As may be seen in FIG. 5, in its initial state, the main layer 60 completely covers the at least one secondary layer 62. As specified hereinabove, the secondary layer 62 may extend from the first longitudinal end 52 as far as the second longitudinal end 54, but equally may extend in a localized manner over part of the external face 48 of the plate 47. The engraving zone 64 is then defined as being the zone of the spoiler that comprises a superposition of layers with at least the main layer 60 and one or more secondary layers 62 covered by the main layer 60. The marking will be produced on all or part of this engraving zone, for example by applying a beam emitted by a laser source (not depicted).

In the example illustrated, the spoiler 16 comprises a first secondary layer 62a and a second secondary layer 62b, with these two secondary layers 62a, 62b exhibiting mutually identical thicknesses and pigmentations that differ from one secondary layer to the other and that differ from the pigmentation of the main layer 60, the composition of the material used furthermore being, in all other respects other than the pigmentation, the same from one layer to another.

When the beam is applied to the engraving zone 64, the beam removes the target part of the material that makes up the main layer 60, through the application of heat. The beam targeting the engraving zone 64 thus makes it possible to form an opening 66 mentioned hereinabove and visible in FIG. 6.

More specifically, in the example illustrated, the emission of a laser beam aimed at various parts of the engraving zone 64 in succession allows the production of a plurality of openings 66 and the creation of a pattern which may consist of a logo of complex shape. The duration of activation of the beam or, more specifically, the number of times that the beam impinges upon the engraving zone, and therefore the duration for which the engraving zone is exposed to the beam, or indeed the intensity of the laser beam emitted, have an impact on the depth of the opening and therefore have an effect on the type of layer of material revealed in the opening.

In the example illustrated, two first openings 66a are made in the engraving zone 64 to form signs, in this instance letters, these first openings being produced to a first depth to reveal the first secondary layer. These first openings 66a are thus made at least in the thickness of the main layer in the engraving zone, covering the secondary layers, and to a maximum thickness of material such that at least part of the first secondary layer 62a is still present and visible through the opening. A second opening 66b has an oblong shape to delimit the marking, in this instance around the first openings 66a, this second opening being produced to a second depth that reveals the second secondary layer 62b. This second opening is thus made in the thickness of the main layer in the engraving zone, overlapping the secondary layers, and in the thickness of the first secondary layer.

The engraving method combined with the spoiler 16 that comprises a multi-layer engraving zone 64 therefore makes it possible to obtain a marking of the external face 48 of the base of the spoiler 16 that exhibits improved durability.

Of course, the invention is not restricted to the examples which have just been described, and numerous modifications may be made to these examples without departing from the scope of the invention. In particular, a greater number of secondary layers may be employed without departing from the context of the invention, it being possible in particular for this variety of layers to increase the diversity of pigments and therefore the variety of the possible markings.

The invention, as has just been described, does indeed achieve its stated objective, and makes it possible to offer a spoiler-marking system that is simple and reliable over time, by proposing a spoiler, of which part forms an engraving zone in which the structure of the spoiler is a multi-layered structure, with a main layer present in each part of the spoiler and forming within itself, in the engraving zone, a housing to accommodate one or more secondary layers. Variants not described here may be implemented without departing from the context of the invention, provided that, in accordance with the invention, they comprise at least two layers according to the aspect of the invention.

What is claimed is:

1. A spoiler of a wiper system of a motor vehicle, said spoiler extends substantially along an elongation length and longitudinal direction of an associated wiper and is configured to be mounted on a wiper extension of the wiper system,
said spoiler being formed from a multi-layer structure, wherein said spoiler comprises
a main layer and at least one secondary layer;
at least one engraving zone in which the main layer has a cavity therewithin said secondary layer that is distinct from the main layer, the engraving zone being configured in such a way that said secondary layer extends within said spoiler while being at least partially covered by the main layer;
wherein said engraving zone is created in a plate that is formed at a base of said spoiler,
the base having a U-shaped cross section with each branch respectively terminating into a leading edge retaining claw and a trailing edge retaining claw;
the plate including an external face that runs contiguous from the leading edge retaining claw and directly into a planar incline feature that extends continuous along the external face towards the trailing edge retaining claw and then extends into a curvilinear air-deflection surface upward into a fin;
the engraving zone formed in the external face of the continuous planar incline feature from a thickness of a number of overlapping layers of the multi-layer structure, such that a direction of stacking is inclined with respect to a vertical direction V of the spoiler; and
an internal face configured to face the associated wiper.

2. The spoiler of claim 1, wherein the engraving zone includes at least one opening in the main layer revealing said secondary layer.

3. The spoiler of claim 1, wherein the main layer and said secondary layer are formed of the same material.

4. The spoiler of claim 1, wherein the main layer and said secondary layer contain distinct pigments.

5. The spoiler of claim 1, wherein the spoiler includes the first retaining claw and the second retaining claw each retaining claw extending from a respective transverse end of the plate in a direction substantially perpendicular to a main direction of elongation of the spoiler and facing one another, at least part of the retaining claws being made of a material that is stiffer than materials used from remaining materials of the spoiler.

6. The spoiler of claim 1, wherein said secondary layer extends in a direction of elongation of the spoiler from a first longitudinal end as far as a second longitudinal end of the spoiler.

7. The spoiler of claim 1, wherein the spoiler includes at least two secondary layers placed one on top of another in a direction of stacking.

8. The spoiler of claim 1, where said wiper and an arm are connected to one another by a connection interface.

9. A spoiler of a motor vehicle wiper system comprising:
- the spoiler configured to be mounted on a wiper extension of said wiper system;
- the spoiler extending along an elongation length and a longitudinal direction of an associated wiper;
- the spoiler being formed from a multi-layer structure, wherein the spoiler further includes
- a main layer and at least one secondary layer;
- at least one engraving zone in which the main layer has a cavity within said secondary layer that is distinct from the main layer, the engraving zone being configured such that said secondary layer extends within said spoiler while remaining at least partially covered by the main layer;
- the engraving zone created along a plate formed within a base of said spoiler, the base having a cross section with a respective branch end terminating into a leading edge retaining claw and a trailing edge retaining claw;
an external face that runs contiguous from the leading edge retaining claw and directly into a planar incline feature that extends continuous along the external face towards the trailing edge retaining claw that then extends into a curvilinear air-deflection surface upward into a fin; and
- the engraving zone formed in the external face of the continuous planar incline feature from a thickness of a number of overlapping layers of the multi-layer structure, such that a direction of stacking is inclined with respect to a vertical direction V of the spoiler.

* * * * *